D. DU BOE.
FEED BAG.
APPLICATION FILED JUNE 10, 1916.

1,220,502.

Patented Mar. 27, 1917.

Inventor
Dominique Du Boe,
By Frederick V. Winters
Attorney

UNITED STATES PATENT OFFICE.

DOMINIQUE DU BOE, OF NEW YORK, N. Y.

FEED-BAG.

1,220,502.  Specification of Letters Patent.  Patented Mar. 27, 1917.

Application filed June 10, 1916. Serial No. 102,850.

*To all whom it may concern:*

Be it known that I, DOMINIQUE DU BOE, a citizen of the United States, and resident of New York, in the county and State of New York, have invented certain new and useful Improvements in Feed-Bags, of which the following is a full, clear, and exact specification.

This invention relates to feed bags, and has for its object to provide improved means for preventing the feed from being spilled from the bag when the animal raises his head, said means being adjustable to fit animals having different sizes of heads. Another object is to provide improved means for closing the upper end of the bag when feed is carried therein. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views.

Figure 1:
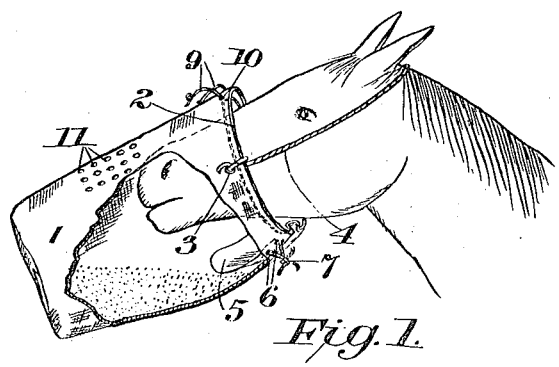
Figure 1 is a broken side view of a bag constructed substantially in accordance with the present invention attached to the head of a horse, the position of the feed retaining apron when the head is thrown up being clearly illustrated.

The bag 1 is preferably made of canvas or other suitable material and is generally cylindrical in shape with its bottom closed and its upper end or mouth normally open. To the upper marginal portion 2 of the bag a halter rope 4 is attached at opposite sides, as at 3, said halter being designed to pass over an animal's head behind the ears, as shown in Fig. 1.

An apron 5 is secured at its upper edge along that portion of the mouth or upper margin 2 of the bag which is disposed under the animal's jaw, while the bottom and lateral edges of said apron hang free from the bag, permitting the apron to flare or spread out over the feed thereby preventing the latter from escaping from the bag when the animal throws his head up as frequently occurs. A portion of the mouth of the bag through which the apron is attached is further provided with spaced pairs of eyelets 6 through which a cord 7 is passed for contracting or drawing up the mouth of the bag below the animal's jaw. Obviously, the cord permits various adjustments to be made in order to fit snugly around heads of different sizes.

Figure 2:
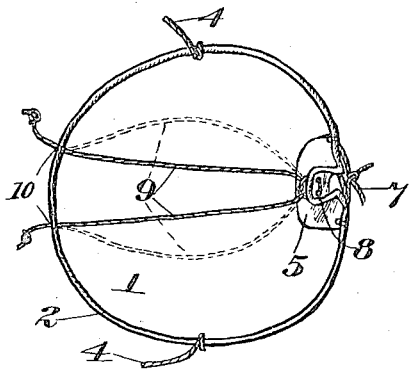
Fig. 2 is a plan view of the bag open.
Figure 3:
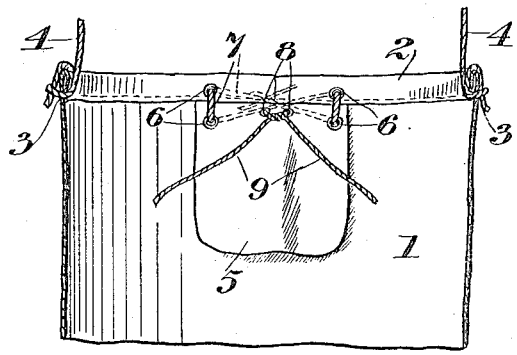
Fig. 3 is an inner face view of the upper portion of the bag, showing the apron in elevation.
Figure 4:
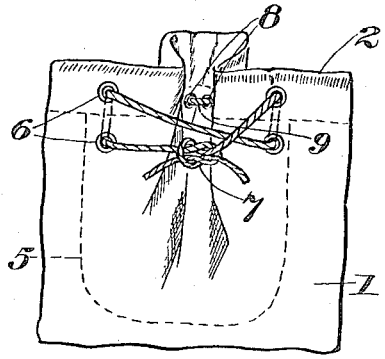
Fig. 4 is a fragmentary elevation of the outer face of the upper portion of the bag, showing the adjustable means for contracting the mouth of the bag below the animal's jaw.
Figure 5:
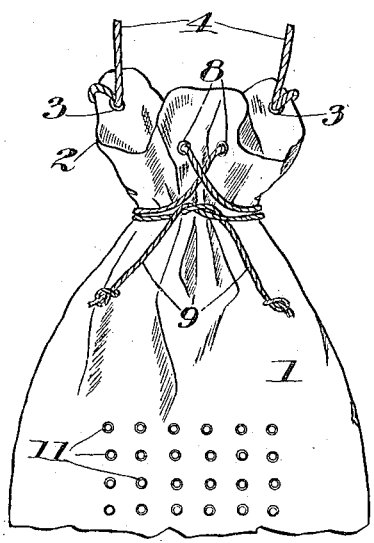
Fig. 5 is an elevation of the upper portion of the bag, showing its mouth closed, as when feed is to be carried therein.

At a desired point along the mouth of the bag another pair of eyelets 8 are arranged, and through them a cord 9 is passed. This cord extends diametrically across the mouth of the bag and is passed through the opposite side thereof, as at 10, the extremities of the cord being preferably knotted, as shown, to prevent them from being drawn through the eyelets 10. The two strands of the cord 9 are of sufficient length to permit them to be spread apart, as illustrated in Fig. 2, thus allowing the animal's head to extend between them. When the bag is not attached to the animal's head, its mouth may be closed by drawing the diametrically opposite points thereof together by means of the cords 9, and then passing said cords about the neck of the bag and tying them as shown in Fig. 5. In this way, feed may be carried in the bag without danger of being spilled. As shown in Figs. 1 and 5, the bag may be provided with suitable openings or perforations 11 to admit air to the animal while he is feeding.

Having thus described my invention, what I claim as new and desire to secure by Letters Patent of the United States is:

1. The combination with a feed bag, of adjustable means for contracting the mouth of the bag below an animal's jaw, and an apron of flexible material arranged on the inside of the bag with its upper edge secured along the adjustable portion of its mouth and adjustable therewith, the bottom and lateral edges of the apron being free from the bag for the purpose specified.

2. The combination with a feed bag, of two strands of cord secured at one point on the mouth of the bag and passed through a diametrically opposite point on said mouth, said strands of cord being of sufficient length to permit an animal's head to be inserted between them without removing their extremities from engagement with the bag, and said cords being also adapted to draw the diametrically opposite points of the mouth together and then be passed around the neck of the bag for the purpose specified.

In testimony whereof I have signed my name to this specification.

DOMINIQUE DU BOE.